Patented July 19, 1927.

1,636,485

UNITED STATES PATENT OFFICE.

WILLIAM HENRY PERKIN, OF OXFORD, AND ALEXANDER WALKER FYFE AND MORDECAI MENDOZA, OF MANCHESTER, ENGLAND, ASSIGNORS TO BRITISH DYE-STUFFS CORPORATION LIMITED, OF MANCHESTER, ENGLAND.

PROCESS FOR THE MANUFACTURE OF ANTHRAQUINONE DERIVATIVES.

No Drawing. Application filed April 5, 1926, Serial No. 99,984, and in Great Britain July 8, 1925.

In the British specification No. 23,968/99, the manufacture of methyl-sulphonic acids of diamino-anthraquinones and analogous bodies is described by treating diamino-anthraquinones with formaldehyde and a sulphite or bisulphite "profitably in the presence of a small quantity of hydrochloric or sulphuric acid." In the application for patent, Serial No. 56,382 of Perkin & Fyfe of September 14, 1925, it is stated that diamino-chrysazin cannot be converted into a solid N-methyl-omega-sulphonic acid derivative by treatment with a formaldehyde bisulphite in the presence of a mineral acid as described in the said specification, and particularly in the examples thereof, and a process of preparing the N-methyl-omega-sulphonic acid of diamino-chrysazin by treating the free base with formaldehyde bisulphite in the complete absence of a strong mineral acid is described.

We have found that in the case of 1.4- and 1.8-diamino-anthraquinone, better yields of the omega-sulphonic acid derivatives can be obtained by working with the free base in the absence of a strong mineral acid, that is to say, by the process described in the specification, Serial No. 56,382 of September 14, 1925, for diamino-chrysazin, than when working as described in the British specification No. 23,968 of 1899. This result is the more surprising because in the case of the 1.5-diamino-anthraquinone, good results cannot be obtained unless the treatment be effected in the presence of strong mineral acid.

We have found that the reaction between the 1.4- and 1.8-diamino-anthraquinone and the formaldehyde bisulphite proceeds very smoothly, using little more formaldehyde bisulphite than that required by theory, if the base is first of all prepared in a finely-divided condition. This can be effected, for instance, by dissolving in sulphuric acid and diluting the solution with water, collecting the finely-divided diamino body and washing it free from acid. On heating the resulting paste in a vessel provided with a reflux condenser with the requisite amount of formaldehyde bisulphite mixture, it gradually dissolves, and after about eight to twelve hours, the omega-sulphonate is obtained and can be salted out by means of sodium chloride.

The following example will serve to illustrate further the nature of the invention, but the invention is not confined to the example.

*Example—Using 1.4-diamino-anthraquinone.*

One gram molecule (238 grams) of the diamino body is slowly added to 1,600 grams concentrated sulphuric acid while stirring, and when addition is complete, the mixture is agitated at 100° C. for about two hours to ensure complete solution. It is then cooled externally, and diluted with 20 litres of ice cold water, added in very fine stream. At first the addition of the water causes thickening, but under very rapid agitation and further addition of water, the mass becomes fluid again. After settling overnight, most of the waste acid is decanted, and the residue is filtered, washed with water until the filtrate is only slightly acid, and then with 2 per cent soda solution, until the filtrate shows slight alkalinity. The slightly alkaline paste is thoroughly incorporated with a mixture (previously made and allowed to stand until cold) of 2.5 gram molecules sodium bisulphite solution of about 40 per cent strength and 2.5 gram molecules formaldehyde of similar strength. The mass is then diluted with 1500 ccs. of water and heated with stirring, under reflux, for about eight hours at 100° C. in an enamelled pan. At the end of this period, and while the resulting solution is still hot, one litre of saturated salt solution is stirred in. The mixture is then cooled to the ordinary temperature, filtered and pressed well.

The purified substance has the formula

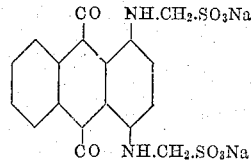

which may be chemically designated as the sodium salt of 1:4 dimethyl-diamino-anthraquinone-di-omega-sulfonic acid.

In the case of the 1.8 diamino-anthraquinone, the conversion to omega-sulphonate proceeds similarly, and is usually complete in about twelve hours.

We claim:—

1. The process of producing salts of N-methyl-omega-sulphonic acid derivatives of diamino anthraquinone which comprises treating the diamino anthraquinone with formaldehyde bisulphite in the absence of mineral acids.

2. The process of producing salts of N-methyl-omega-sulphonic acid derivatives of 1:4 diamino anthraquinone which comprises treating 1:4 diamino anthraquinone with formaldehyde bisulphite in the absence of mineral acids.

3. The process of producing salts of N-methyl-omega-sulphonic acid derivatives of 1:4 diamino anthraquinone which comprises treating finely divided diamino anthraquinone with formaldehyde bisulphite in the absence of mineral acids.

4. As a new product, the substance having the structural formula

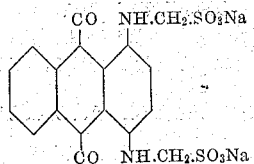

In testimony whereof we have hereunto affixed our signatures.

WILLIAM HENRY PERKIN.
ALEXANDER WALKER FYFE.
MORDECAI MENDOZA.